United States Patent [19]
Rudy et al.

[11] Patent Number: 4,962,568
[45] Date of Patent: Oct. 16, 1990

[54] METHOD AND APPARATUS FOR AUTOMATICALLY CUTTING FOOD PRODUCTS TO PREDETERMINED WEIGHT OR SHAPE

[75] Inventors: Norman A. Rudy, Renton; James S. Tomlin, Seattle, both of Wash.

[73] Assignee: Design Systems, Inc., Bellevue, Wash.

[21] Appl. No.: 383,789

[22] Filed: Jul. 24, 1989

Related U.S. Application Data

[62] Division of Ser. No. 171,774, Mar. 22, 1988, Pat. No. 4,875,254.

[51] Int. Cl.$^5$ ............................................. A22C 25/18
[52] U.S. Cl. ........................................ 17/52; 17/54; 83/177
[58] Field of Search ................ 17/54, 61, 52, 1 R; 83/177

[56] References Cited

U.S. PATENT DOCUMENTS

| | | | |
|---|---|---|---|
| 3,800,363 | 4/1974 | Lapeyre | 17/61 |
| 4,557,019 | 12/1985 | Van Devanter et al. | 17/54 |
| 4,726,094 | 2/1988 | Braeger | 17/61 |
| 4,748,724 | 6/1988 | Lapeyre et al. | 17/61 |

*Primary Examiner*—Willis Little
*Attorney, Agent, or Firm*—Olson & Olson

[57] ABSTRACT

Food products, such as fish fillets, chicken fillets and many others, are cut to predetermined portion sizes of equal weight and volume, or to predetermined profile shapes, by moving the food products on a conveyor, scanning them as then move through a shadow line with a camera capable of providing a programmed computer with dimensional data, and utilizing the computer to control the operation of a plurality of high pressure water jet cutters to cut the food products to reduced sizes as dictated by the computer program.

11 Claims, 9 Drawing Sheets

METHOD AND APPARATUS FOR AUTOMATICALLY CUTTING FOOD PRODUCTS TO PREDETERMINED WEIGHT OR SHAPE

This is a division of application Ser. No. 07/171,774, filed 22 Mar. 1988 now U.S. Pat. No. 4,875,754.

BACKGROUND OF THE INVENTION

This invention relates to the commercial processing of food products, and more particularly to the automatic cutting of fish fillets and other food products to predetermined portion weights or profile shapes.

Commercial production of fish fillets of predetermined portion weights heretofore has been afforded by the method and apparatus disclosed in U.S. Pat. No. 4,557,019. This method and apparatus involves the intermittent scanning of fish fillets as they move along a conveyor to determine the weights of a plurality of longitudinally adjacent thin slices of each fillet and the number of such slices required to produce the desired portion weight, and then activating a cutter to move transversely across the conveyor to cut the fillet along lines which correspond to the number of slices in each fillet portion, to produce a plurality of portions of equal weight and volume.

Although the above described method and apparatus is satisfactory for limited commercial production, it is incapable of a production level necessary to keep up with present day food assembly and packaging operations. Further, it is incapable of producing fish fillets and other food products of predetermined profile shapes, such as are desirable in the packaging of sandwiches, frozen dinners and other foods.

SUMMARY OF THE INVENTION

In its basic concept, the method and apparatus of this invention involves the scanning of fish or chicken fillets or other food products as each moves along a conveyor, to determine the plan and/or thickness profiles of the product, and activating one or more cutters to cut the product to predetermined profile shapes or portion weights.

It is by virtue of the foregoing basic concept that the principal objective of this invention is achieved; namely, to overcome the aforementioned limitations of U.S. Pat. No. 4,557,019. Specifically, the method and apparatus of this invention provide the following improvements over the method and apparatus disclosed in said patent:

The present invention provides increased commercial production of cut food products by providing faster cutting and by cutting completely through the food product on the conveyor line.

Increased commercial production also is achieved by allowing food products to be placed upon the infeed end of the processing conveyor randomly at diverse angles relative to the line of conveyor movement, thereby allowing more rapid delivery and deposit of food product on the conveyor.

Increased commercial production also is achieved by allowing the deposit of food product at the infeed end of the conveyor in a plurality of laterally spaced production lanes on the single conveyor, for simultaneous processing.

The method and apparatus of this invention also enable the cutting of food products to any desired profile shape, independently of weight or while maintaining a predetermined weight.

The method and apparatus of this invention also accommodate the removal of undesirable areas of a product, such as the strips of fat and blood spots extending into fish fillets and the peripheral fat of chicken breasts and other meats.

The method and apparatus of this invention provide for the cutting of food products to diverse profile shapes by the controlled movement of a line-type cutter transversely across the conveyor at various speeds and direction to effect cutting the food products along longitudinally extending profiling lines during movement on the conveyor.

The method and apparatus of this invention utilize line-type cutters such as a laser or, preferably, a high pressure water jet, mounted to be moved very quickly or at slower, variable speeds transversely across the conveyor. Use of high pressure water jet cutting ensures retention of the product in position on the conveyor and consequent accuracy of cutting; it minimizes kerf loss; and precludes spoilage of product which can result from cutting with a metal saw or other cutter.

Further the line-type cutters utilized in the method and apparatus of this invention are mounted for adjustment transversely across the conveyor to fixed positions for cutting food product as it moves on the conveyor, thereby achieving cutting at the rate of speed of the conveyor rather than the faster rate of speed of the cutter per se, thereby enabling the cutting of frozen food as well as other dense and fibrous products.

The foregoing and other objects and advantages of this invention will appear from the following detailed description, taken in connection with the accompanying drawings of preferred embodiments.

BRIEF DESCRIPTION OF THE DRAWINGS

FIGS. 21-24 are plan views illustrating schematically the stages of cutting a chicken breast by operation of the apparatus of FIGS. 14-16 to remove peripheral areas and produce a pair of chicken fillet segments of desired profile shapes.

DESCRIPTION OF THE PREFERRED EMBODIMENTS

Referring first to the embodiment illustrated in FIGS. 1-7, the components of the apparatus are supported on a framework 10 of horizontal and vertical frame members. The infeed end portion of the apparatus includes an endless infeed conveyor belt 12 supported at its rear, infeed end on a transverse idler roll 14. The upper, working stretch of the infeed belt extends forwardly to a small diameter forward nose bar 16, thence downward and rearward about an enlarged drive roll 18, forward around a belt tightener roll 20, and thence rearward to the rear, infeed roll 14. A first intermediate conveyor belt 22 extends forwardly from the infeed belt 12. Its rearward ends is supported by small nose bar 24 spaced closely adjacent the small forward nose bar 16 to provide a narrow gap 26 therebetween for operation of a cutter component to be described hereinafter. The upper working stretch of the intermediate conveyor belt 22 extends forwardly to another small diameter nose bar 28, thence angularly downward and rearward about a drive roll 30, forward around a belt tightener roll 32 and thence rearward to the first named small nose bar 24.

A second intermediate conveyor belt 34 extends forwardly from the first intermediate conveyor belt 22. Its rearward end is supported by a small diameter nose bar 36 spaced closely adjacent the small forward nose bar 28 of the first intermediate conveyor belt 22, providing a small transverse gap 38 therebetween for the operation of a profiling cutter component described hereinafter. The upper working stretch of the second intermediate conveyor belt 34 extends forwardly to a small diameter nose bar 40, thence angularly downward and rearward around a drive roll 42, rearward around a belt tightening roll 44 and thence rearward to the rear support nose bar 36.

A third intermediate conveyor belt 46 extends forwardly from the second intermediate conveyor belt 34. Its upper working stretch extends between a small diameter rearward nose bar 48 and a small diameter forward nose bar 50. The belt extends angularly downward and rearward from the forward nose bar, over a small belt tightener roll 52, thence downward under a drive roll 54 and upward over a second belt tightener roll 56, thence rearward to the rear nose bar 48. This rearward nose bar is spaced forwardly closely adjacent the forward nose bar 40 of the second intermediate conveyor belt 34, providing a narrow transverse gap 58 for operation of a cutter component to be described hereinafter.

An outfeed conveyor belt 60 extends forwardly of the third intermediate conveyor belt 46. Its rearward end is supported by a small diameter nose bar 62 spaced forwardly closely adjacent the small forward nose bar 50 of the third intermediate conveyor belt, to provide a narrow transverse gap 64 therebetween for operation of still another cutter component to be described hereinafter. The upper working stretch of the outfeed conveyor extends forwardly around a forward drive roll 66 and thence rearward to the small rearward nose bar 62.

The drive rolls are mounted for rotation with drive shafts 68 supported by and extending transversely of the framework 10. The drive shafts are interconnected for simultaneous rotation by any conventional means, such as sprockets and interconnecting chains coupled to a common electric drive motor. The arrangement of drive sprockets is such that all of the conveyor belts are moved in the forward, outfeed direction at a uniform rate of speed.

Adjacent the infeed end of the infeed conveyor 12, the framework supports a housing 70 which extends upwardly from the conveyor belt and confines therein a camera 72 mounted on a support 74 and disposed angularly with respect to the working surface of the conveyor belt. The housing is partitioned by a vertical wall 76 to form a light chamber 78. A transverse wall 80 in the light chamber supports a plurality of light sources 82 spaced apart transversely with respect to the conveyor belt.

The bottom wall of the light chamber 78 is formed with a transverse slot 84 for the passage of light. The leading edge 86' of the transverse beam of light, with respect to the direction of movement of the conveyor belt, defines a sharp shadow line 86 (FIG. 8) that extends transversely across the conveyor belt, since the area forwardly of the light beam is dark.

Figure 8:
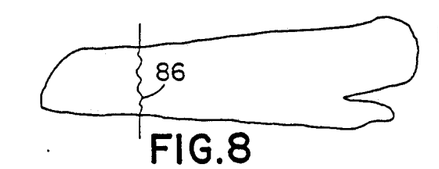
FIGS. 8–13 are plan views illustrating schematically the stages of cutting of a fish fillet by operation of the apparatus of FIGS. 1-7 to produce a plurality of pieces having shapes and weights within prescribed limits.

It will be understood that the transverse shadow line 86 will be a straight line across the conveyor belt 12 when no food product intercepts the shadow line. However, as illustrated in FIG. 8 of the drawings, when a fillet or other food product on the conveyor belt passes across the shadow line, the upper, irregular surface of the food product produces an irregular shadow line, as viewed from the angularly disposed camera. A large number of points along the irregular shadow line detected by the camera and computer system are offset from the positions they occupy when the food product is not present, and the displacement represents the thickness of the food product at each specific point. The shadow line is provided by a very simple, trouble-free and inexpensive structural arrangement.

Openings 88 and 90 in the bottom portion of the upstream and downstream sides of the housing 70 allow the passage of food product on the conveyor through the housing. The opening 88 in the upstream wall of the housing is shielded by a rearwardly extending cover 92 the upstream end of which is open and is covered by a cloth or other flexible screen 94. This screen allows the passage of food product on the conveyor belt while minimizing the entrance of ambient light into the housing. The shadow line 86 thus is maintained at maximum contrast.

The camera is a conventional video camera that functions with computer 96 to convert the shadow (line) configuration to electric signals which represent the width and thickness dimensions of the product. The length of the product is determined by the sum of the number of longitudinally adjacent segments of the product that are counted as thickness contours by encoder pulses generated at time intervals corresponding to a predetermined forward movement of the conveyor, e.g. every one-fifth of an inch. For this purpose, an encoder 95 is driven by shaft 68 through a sprocket and chain drive assembly. These electric signals representing the width, height and/or number of thickness contours are utilized to operate computer 96 in accordance with a desired computer program to effect program-designated movements of the cutters to effect cross cuts or profile cuts.

A preferred form of camera 71 is available commercially as video camera Model No. TM 240T from Pulnix America, Inc. for use with a wide variety of computer systems.

Figure 9:
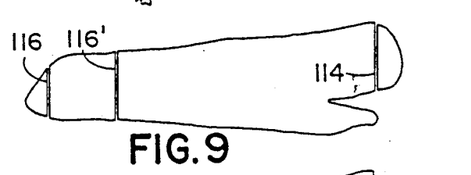

The food product scanned by the camera at the shadow line progresses downstream and transfers from the outfeed end of the infeed conveyor 12 to the upstream end of the first intermediate conveyor 22. As the food product moves across the narrow transverse gap 26 between the conveyors, leading and trailing end portions of the food product may be cut, if desired, as illustrated in FIG. 9. This is achieved by operation of a cutter that moves through the transverse gap 26 at a sufficiently high rate of speed as to produce a cut in the food product substantially perpendicular to the direction of movement of the conveyor.

In accordance with this invention, the cutter is of the line-type, i.e. a cutter that provides a cutting edge in the form of a substantially vertical line through the gap 26. Thus, a line-type cutter may be a laser beam cutter. Alternatively, it may be a fluid pressure cutter employing oils or other liquids, or air or other gas under high pressure.

In the preferred embodiment illustrated, the line-type cutter is a high pressure water jet that is delivered through a tiny jeweled orifice 98 of preselected size from a water pressure intensifier capable of providing water pressure of about 10,000 to 60,000 pounds per square inch for most food products. It will be understood that the water pressure may be varied over a greater range, as required.

Figure 1:
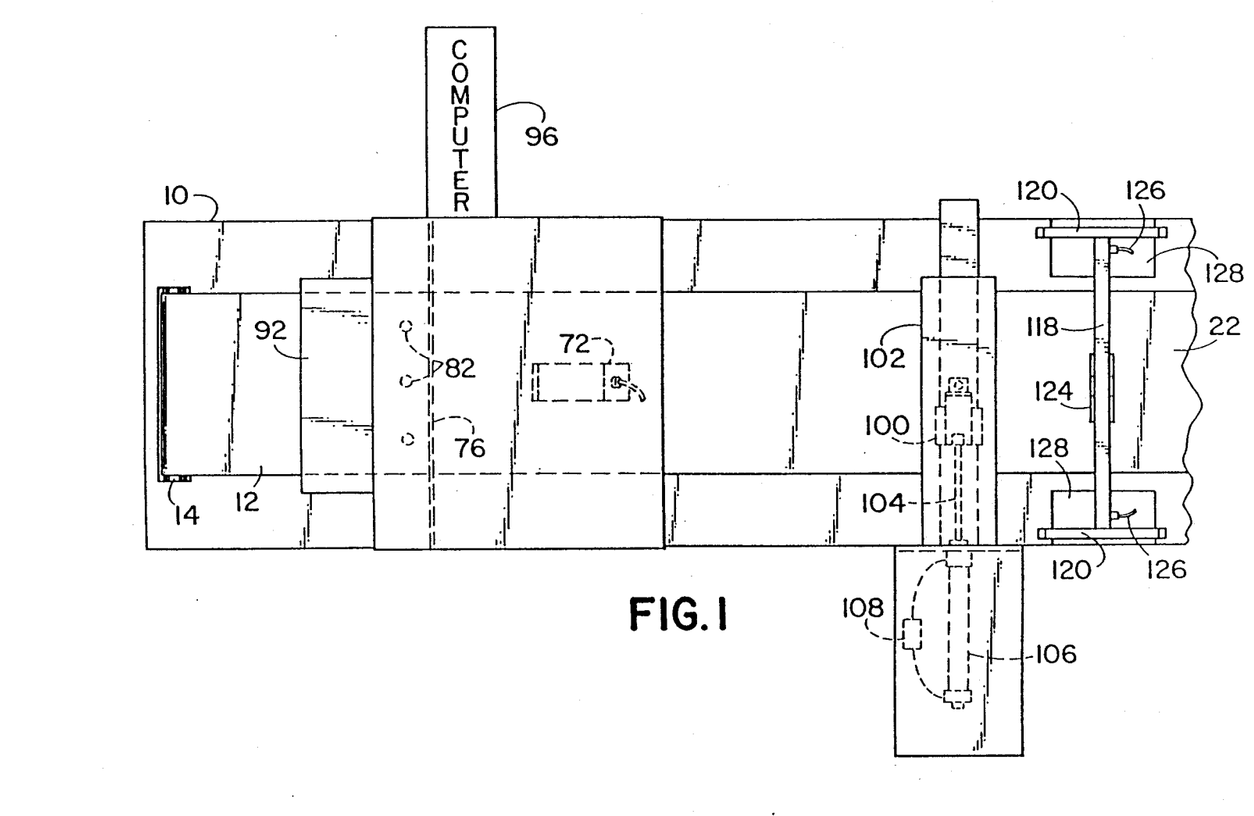
FIG. 1 is a plan view of the infeed end portion of food cutting apparatus embodying the features of this invention.
Figure 2:
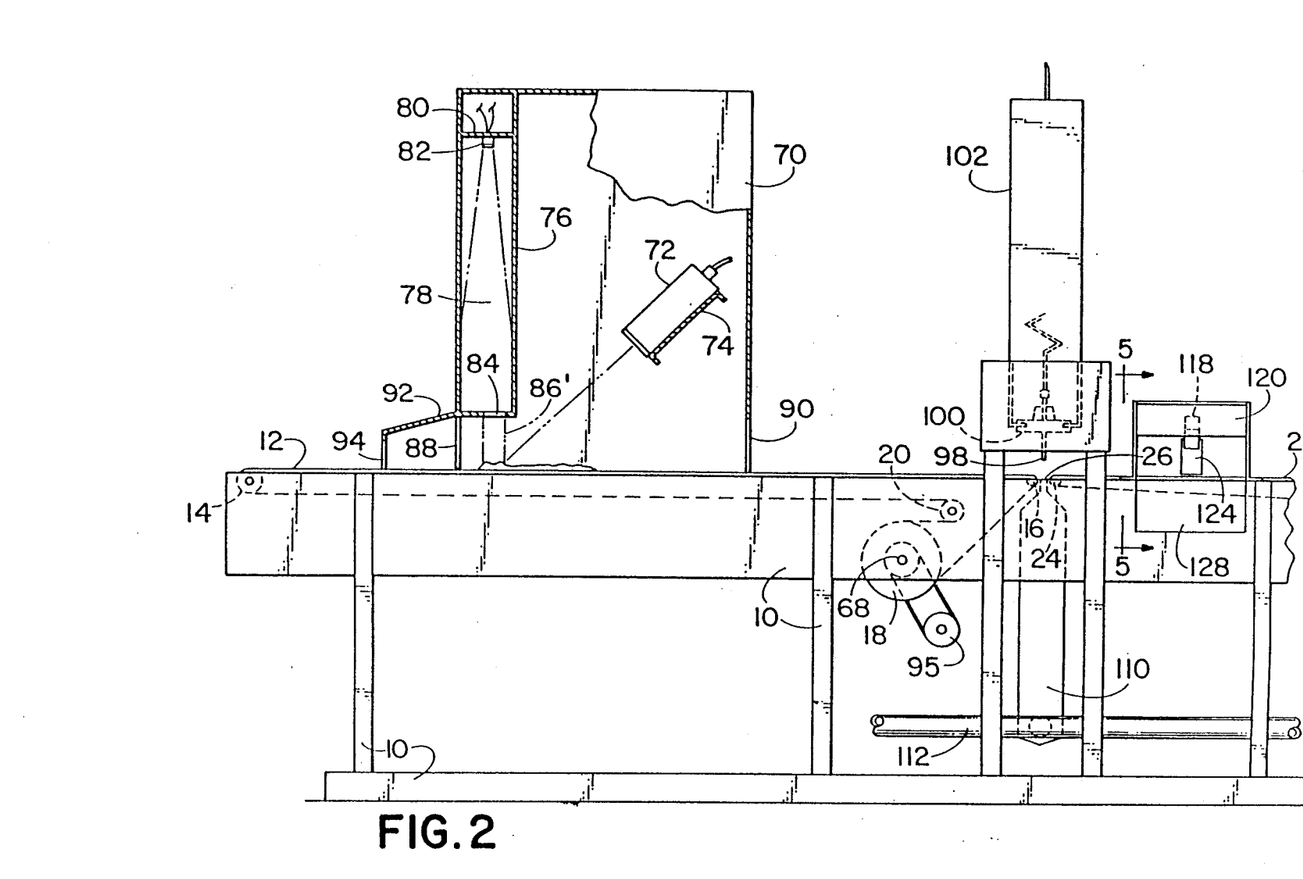
FIG. 2 is a side elevation as viewed from the bottom in FIG. 1.

As illustrated in FIGS. 1 and 2, the water jet orifice 98 is supported by a carriage 100 mounted for transverse movement through a housing 102 preferably supported independently of the framework 10 to isolate carriage vibrations from the framework and camera 72. The carriage is connected to the outer end of a piston rod 104 the piston of which is reciprocated within an elongated fluid pressure cylinder 106 mounted on the framework. Although hydraulic fluid may be utilized as the source of power, pneumatic pressure is preferred for the fluid pressure piston-cylinder unit. Operation of the piston-cylinder unit is effected by an electrically actuated valve 108 which is controlled by computer 96. Electric servo motors also may be employed as a source of power.

The high pressure water jet that passes through the gap 26 between the conveyors is collected in a reservoir 10 and returned through a conduit 112 either to waste or to a reservoir coupled to the initial stage of water pressurization.

It has been found that transverse movement of the cross-cut cutter 98 of up to about 300 feet per minute, with a conveyor speed of about 50 feet per minute, produces satisfactory transverse cuts through many food products. This is a distinct advantage over the rotating disc cutter arrangements described in U. S. Pat. No. 4,557,019, since the disc cutter must be mounted for transverse movement on a frame disposed at an oblique angle with respect to the line of movement of the conveyor, to compensate for the movement of the food product on the conveyor during the relatively slow traverse of the disc cutter.

Anothe advantage of the line-type cutter employed in the present invention over the disc cutter of the patent aforesaid resides in the ability of the line-type cutter to operate in both directions of transverse movement. In contrast, the disc cutter of the patent is operable only in one transverse direction of movement across the conveyor and then must be raised vertically out of the path of travel of the food product for return to the starting position for the next cut.

Thus, referring to FIG. 9 of the drawings, the leading portion of the illustrated fillet is cut along line 114 by movement of the line-type cutter 98 in one direction through the gap 26 transversely across the conveyor line, and the trailing portion of the fillet is cut along the line 116 by movement of the cutter in the opposite direction. Moreover, the speed of movement of the cutter relative to the speed of forward movement of the conveyor line is such that if desired the fillet may be cut transversely into a substantial number of small portions. For example, a cut 116' may be made to produce a trailing tail portion of predetermined weight and volume.

Means is provided for removing the severed leading and trailing end portions of the food product as it moves along the first intermediate conveyor 22. As illustrated in FIGS. 1 and 2, an elongated hollow rodless cylinder 118 extends transversely above the conveyor belt and is supported at its opposite ends by mountings 120 secured to the framework 10. A piston within the cylinder is provided with a stem 122 (FIG. 5) that extends downwardly through a longitudinal slot in the cylinder and mounts at its bottom exposed end a sweeper member 124 that is movable transversely across the conveyor belt by air pressure supplied selectively to one end or the other of the cylinder, through air conduits 126. The sweeper member is provided with oppositely facing surfaces configured to engage severed portions of food products and sweep them transversely off of the sides of the conveyor 22 and into discharge chutes 128 for collection by suitable means. Such discarded end pieces may be processed for conversion to animal feed or other suitable by-products.

Figure 3:
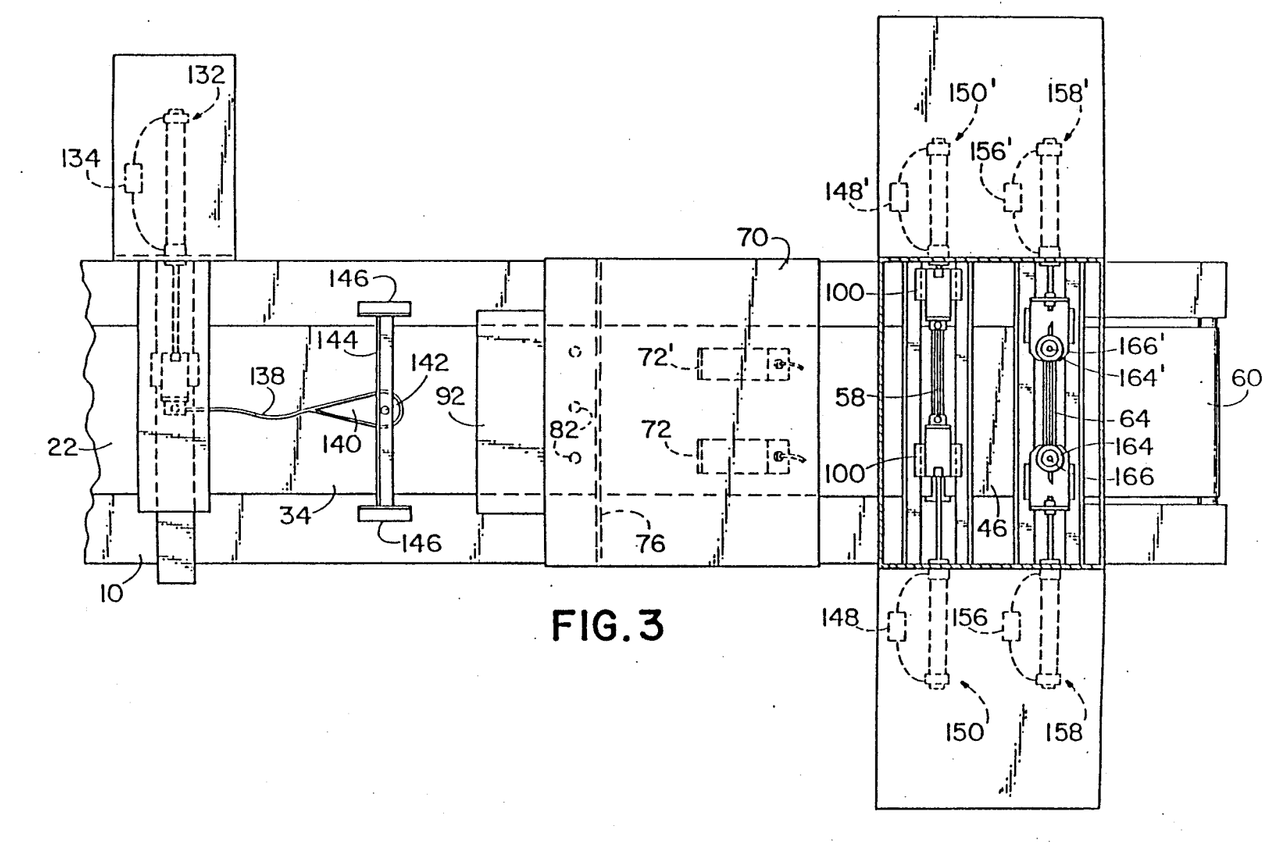
FIG. 3 is a plan view of the outfeed end portion of the apparatus of FIG. 1.
Figure 4:
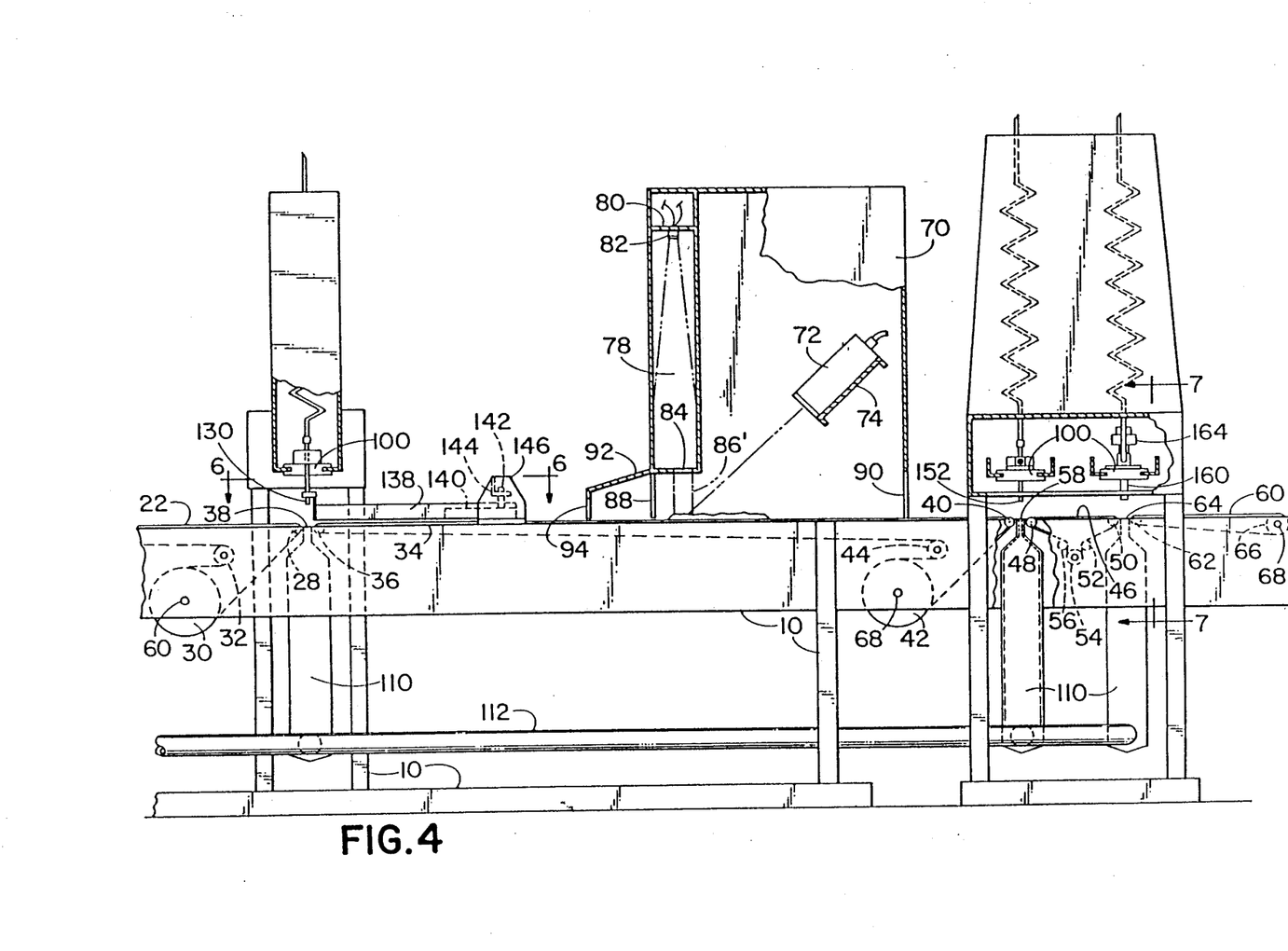
FIG. 4 is a side elevation as viewed from the bottom in FIG. 3.
Figure 5:
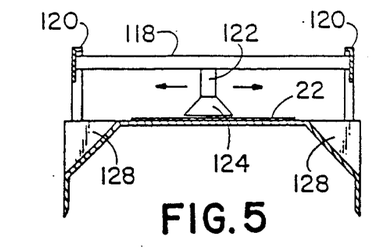
FIG. 5 is a fragmentary vertical section taken on the line 5—5 in FIG. 2.
Figure 10:
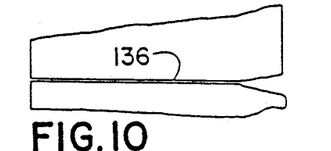

Referring now to FIGS. 3 and 4 of the drawings, the trimmed fillet of FIG. 9 moves forwardly on the first intermediate conveyor 22, and as it passes across the narrow gap 38 between the first and second intermediate conveyors 22 and 34, respectively, it is subjected to the cutting action of a line-type profile cutter 130 which functions to cut the food product longitudinally between leading and trailing "landmark" points into two lateral pieces, as illustrated in FIG. 10. In the embodiment illustrated, the line-type cutter is of the high pressure water jet type previously described. However, the fluid pressure drive piston-cylinder unit 132 for the carriage 100 is operated by an electrically actuated valve 134 and encoder (not shown) under the control of the programmed computer. The encoder identifies for the computer the exact position of extension of the piston rod and hence the exact position of the cutter orifice 130 and high pressure water jet relative to the food product being cut.

Accordingly, the food product having previously been scanned by the camera 72 and its profile shape having been extracted by the computer 96, the computer then may direct initial positioning of the high pressure water jet orifice laterally of the conveyor belt to intercept the leading end of the fillet (FIG. 10) at the "landmark" point desired for initiating the longitudinal cut 136 through the food product.

Moreover, since the position of the food product on the conveyor has been established by the scanning camera and the computer program has defined the "landmark" point on the trailing end of the food product at which the longitudinal cut is to terminate, the computer thus activates the control valve 134 to move the carriage 100 and hence the water jet orifice 130 transversely at a controlled rate of speed to effect the longitudinal cutting of the food product on the line 136 extending between the leading and trailing "landmark" end points.

Figure 11:
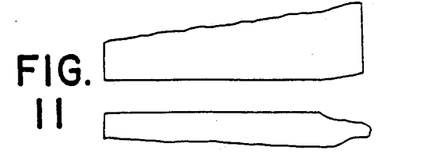

Since the longitudinal pieces may be of different size, weight and shape, it is desirable to further process each piece independently of the other. Accordingly, the two longitudinal pieces are caused to be separated laterally for subsequent individual processing. For this purpose an elongated flexible ribbon 138 of synthetic thermoplastic resin or other suitable material is connected at one end to the water jet orifice 130 for transverse movement therewith. The opposite end portion of the ribbon encircles plow member 140 which is secured by a pin 142 to a bar 144 which extends transversely across and above the conveyor belt 34. The bar is supported at its opposite ends by brackets 146 mounted on the framework 10. The point 142 of attachment of the plow 140 to the transverse bar 144 preferably is at the longitudinal centerline of the conveyor belt. The side walls of the plow diverge from its trailing end symmetrically about the attachment point 142 to a lateral dimension corresponding to the desired lateral spacing of the two longitudinal pieces of the food product, as illustrated in FIG. 11.

Figure 6:
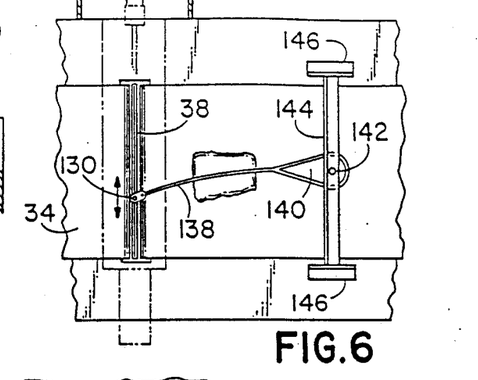
FIG. 6 is a fragmentary horizontal section taken on the line 6—6 in FIG. 4.

Referring to FIG. 6 of the drawings, it is to be noted that the flexible ribbon 138 allows the water jet orifice 130 to be moved laterally across the conveyor belt as needed to effect the longitudinal cut 136 through the food product. The lateral pieces of the food product then are guided by the ribbon to the central portion of the conveyor belt where they are separated by the plow 140.

The separated pieces of the food product then progress forward on the belt 34 to a second scanning system (FIGS. 3 and 4). Since this scanning system is substantially identical to the scanning system first described, the components thereof are identified by the same reference numerals. In this regard, although this second scanning system is shown to include two laterally spaced cameras 72 and 72' for scanning the separated longitudinal pieces of the food product, it is to be understood that a single camera may be employed to scan both pieces and provide the computer with the same information.

Figure 7:
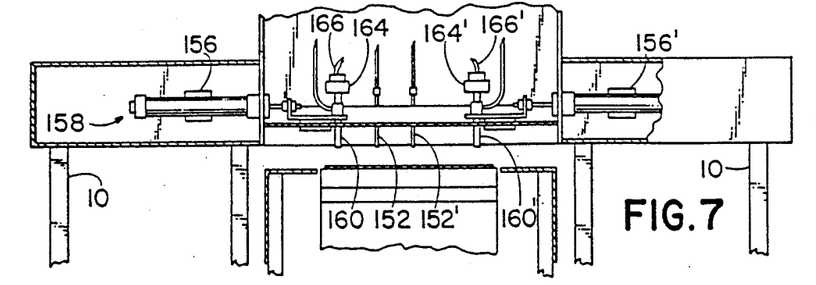
FIG. 7 is a fragmentary vertical section taken on the line 7—7 in FIG. 4.
Figure 12:
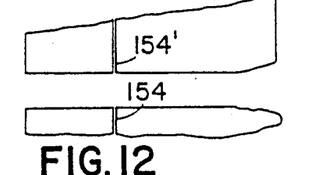

Let it be assumed, for purposes of this description, that with the information provided by the scanning cameras the computer determines that both lateral pieces of the food product need to be cut transversely. The computer thereupon activates the valves 148 and 148' of the piston-cylinder units 150 and 150' of both laterally spaced high pressure water jet cross-cut cutters 152 and 152' (FIG. 7). Accordingly, their supporting carriages 100 are moved rapidly toward the centerline of the conveyor belt 34, to effect transverse cutting of both food product pieces along cut lines 154 and 154', as illustrated in FIG. 12.

Figure 13:
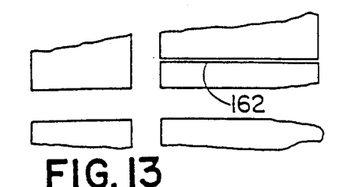

Let it also be assumed, for the purpose of this description, that with the information delivered to the computer by the scanning cameras the computer determines that the leading section of the upper piece of food product on the conveyor belt is sufficiently large as to require further longitudinal cutting into two lateral pieces. The computer thus activates the valve 156' of the piston-cylinder unit 158 of the upper high pressure water jet profiling cutter 160' to move the cutter laterally to the appropriate position for initiating the longitudinal cut at the leading end of the food product section. Thereafter the cutter 160' is moved slowly, as necessary, to effect the longitudinal cut 162 ending at the desired point at the trailing end of the food product section, as illustrated in FIG. 13.

During the foregoing profiling operation, the companion profiling cutter orifice 160, its supporting carriage and piston-cylinder unit 158 and valve 156 remain inactive, since the pieces of food product on the lower half of the conveyor belt are not to be cut longitudinally.

It is to be noted in FIGS. 3, 4 and 7 that the final pair of high pressure water jet profiling cutters 160 and 160' are of the type that accommodate selective turning on and off of the water jets, whereas the preceding cutters operate with the water jets being on continuously. Control of the water jets of the profiling cutters is afforded by pneumatically controlled valves 164 and 164'. Air pressure for the valves is supplied through conduits 166 and 166' in which a computer controlled valve (not shown) governs the delivery of air pressure from a source. Pneumatically controlled valves of this type are available commercially.

Referring again to FIG. 13 of the drawings, the resulting five pieces of food product exit the apparatus on the outfeed conveyor 60, from whence they are delivered for packaging or other further processing. The five pieces are shown to be of different shapes and sizes, but each is within a preselected weight range.

Figure 14:
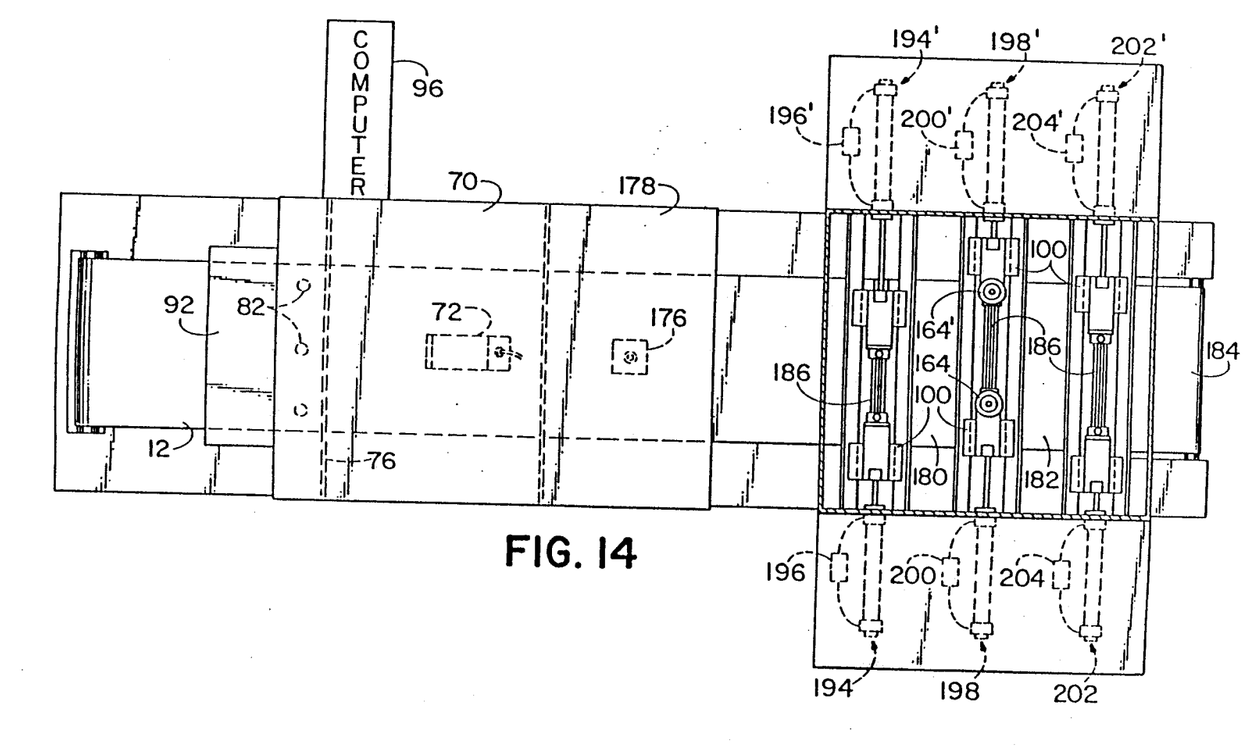
FIG. 14 is a plan view of a second embodiment of food cutting apparatus embodying the features of this invention.
Figure 15:
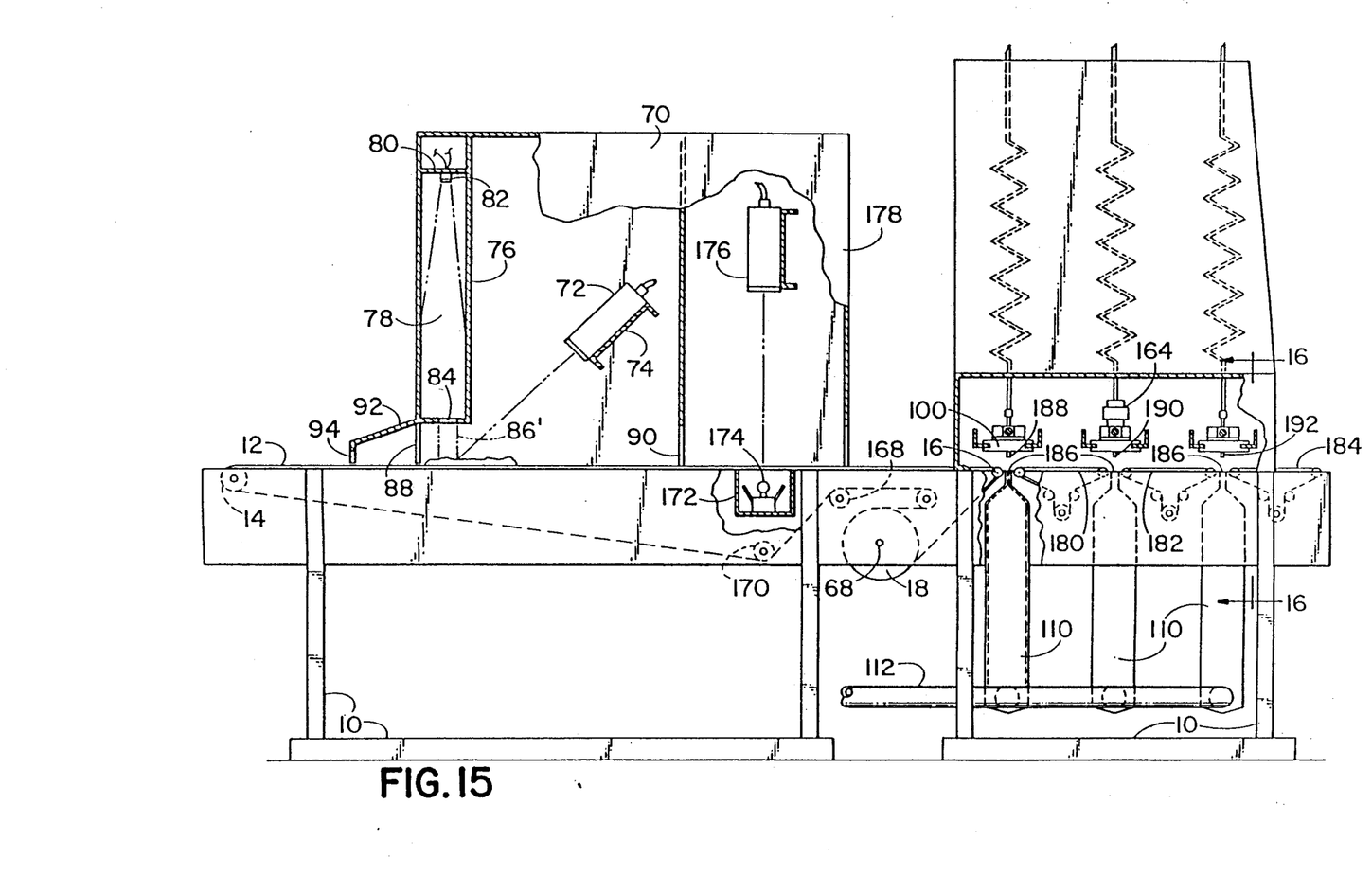
FIG. 15 is a side elevation as viewed from the bottom in FIG. 14.
Figure 16:
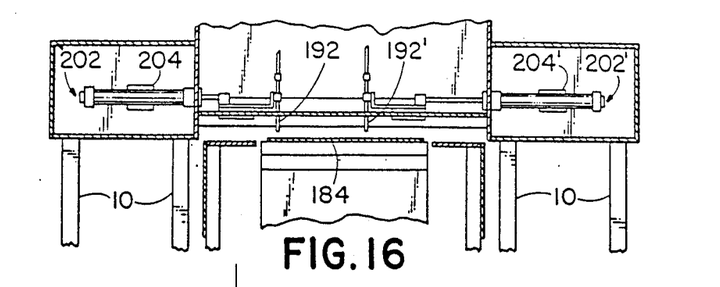
FIG. 16 is a fragmentary vertical section taken on the line 16—16 in FIG. 15.

Referring now to the second embodiment illustrated in FIGS. 14-16, the frame 10 is shown to support an infeed conveyor 12 as in the first embodiment described. Two additional guide rolls 168 and 170 are provided for the return stretch of conveyor belt to make room for a candling light box 172 and lamp 174 discussed hereinafter. Associated with the infeed conveyor is a scanning camera 72 and light source 82 as in the first embodiment. In addition thereto, a second camera 176 is mounted in a adjacent housing 178 in vertical alignment with the candling light source 174. For this purpose the conveyor belt 12 is of the translucent type to allow the light source on the underside of the belt to shine through. The light source thus serves a candling function to expose to the camera the areas of fat contained in fish fillets and other food products so that they may be removed as undesirable.

Downstream from the infeed conveyor 12 are two intermediate conveyors 180 and 182 and an outfeed conveyor 184, all illustrated as being of the type described hereinbefore as the third intermediate conveyor belt supported by the small nose bars 48 and 50, belt tightener rolls 52 and 56 and drive roll 54. As in the previous embodiment, the drive shafts 68 for all of the conveyors are coupled together to a common drive motor for simultaneous rotation to move all of the conveyor belts in the outfeed direction at the same rate of speed.

Registering with the narrow transverse gaps 186 between adjacent conveyor belts are pairs of line-type cutters, herein shown to be of the high pressure water jet type. In the embodiment illustrated, there are three pairs of such cutters. The upstream pair 188 and 188' and middle pair 190 and 190' are of the profiling cutter type, while the downstream pair 192, 192' are of the fast moving cross-cut type, as previously described. The upstream cutters 188 and 188' are moved by piston-cylinder units 194 and 194' controlled by computer operated valves 196 and 196', respectively. Piston cylinder units 198 and 198' and control valves 200 and 200' are associated with middle cutters 190 and 190', and piston-cylinder units 202 and 202' and control valves 204 and 204' are associated with downstream cutters 192 and 192'. In the embodiment illustrated, the middle cutters 190 and 190' are of the same type as cutters 160 and 160' described hereinbefore as being controlled by pneumatic valves 164 and 164'.

Figure 17:
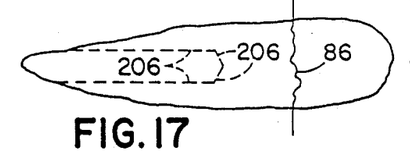
FIGS. 17–20 are plan views illustrating schematically the stages of cutting of a fish fillet by operation of the apparatus of FIGS. 14–16 to remove a central strip of fat from a fish fillet and then cut the remainder to produce a plurality of pieces of predetermined size or weight.
Figure 18:
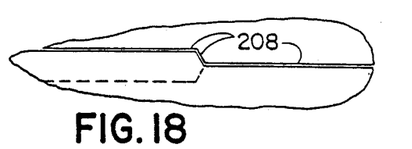
Figure 19:
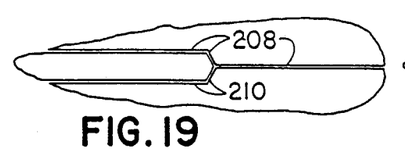

A typical operation of the apparatus of FIGS. 14–16, utilizing the candling component, is illustrated in FIGS. 17–20. FIG. 17 illustrates a fish fillet in which a trailing central portion outlined by broken lines 206 is a strip of fat which is desired to be removed. As the fillet progresses forwardly on the infeed conveyor 12, it is first scanned by the first camera 72 and shadow line 86 described hereinbefore to determine its overall profile and to supply that information to the computer 96. The fillet progresses forwardly across the candling light source 174 which exposes the outline of the strip of fat to the second camera 176. The size, shape and location of the fat strip thus is provided to the computer which thereupon functions to control the operation of the cutters, as follows:

First (FIG. 18), one of the profiling cutters 188 or 188' of the upstream pair is moved progressively at an appropriate slow speed to effect the longitudinal cutting of the fillet along the line 208. As the fillet progresses forwardly, the middle profiling cutter 190 or 190' on the same side of the conveyor belt as the previously operated upstream cutter, is turned on by valve 164 or 164' at the inner end of the fat strip at cut line 208, to make the cut along the line 210 (FIG. 19). The strip of fat thus is severed from the main body of the fillet which has been separated into two longitudinal pieces.

Figure 20:
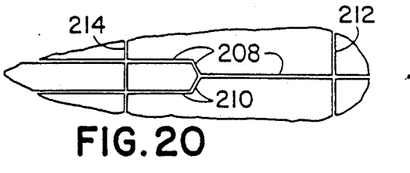
Figure 23:
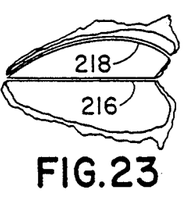
Figure 24:
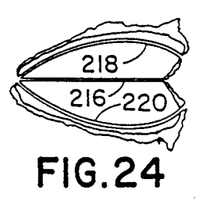

As the severed pieces of the fillet progress forwardly, the downstream cross-cut cutter 192 or 192' on the same side of the conveyor belt as the preceding profiling cutters, is activated to move quickly across the corresponding half of the conveyor line to produce the leading transverse cut 212 shown in FIG. 20 to remove the undesired tip section of the fillet. As the fillets progress forwardly, the same cross-cut cutter is once again activated to retrace its return path through the gap 186 to effect the trailing transverse cut 214 to remove the undesired trailing sections of the fillet.

The assembly of scrap and desired sections of the cut fillet exit the outfeed conveyor 184 from whence the desired fillet sections are retrieved from the scrap pieces for subsequent packaging or other processing. As before, the scrap pieces are further processed.

In the event the strip of fat is wider on the top of the fillet than on the bottom, or vice versa, the profile cutters may be tilted angularly in the lateral direction of the conveyor, to minimize the cutting away of valuable food products.

The apparatus of FIGS. 1–16 also may be operated in an alternative mode which need not involve the candling stage. An illustration is shown in FIGS. 21–24 wherein a chicken breast is to be cut to produce a pair of similarly shaped segments of the same or different weights for the mass production of sandwich cuts or other food articles.

Thus, the initial chicken breast progresses forwardly from the infeed end of the infeed conveyor 12 for scanning by the scanning camera 72 and shadow line 86 described hereinbefore, to provide information to the computer 96 as to the plan and elevation profiles of the chicken breast. The information having been delivered to the computer, the latter operates one of the pair of upstream profiling cutters 188 or 188' to sever the chicken breast longitudinally along the desired line 216, as illustrated in FIG. 22. As the longitudinally severed chicken breast progresses forwardly, the middle profiling cutter 190 or 190' on the same side of the conveyor belt as the previously operated upstream profiling cutter, is activated to cut one longitudinal section of the severed chicken breast along the curve line 218 illustrated in FIG. 23. As the sections progress still further forward, the downstream cutter 192 or 192' on the same side of the conveyor belt as the preceding profiling cutters is operated as a third profiling cutter to cut the other longitudinal section along the curved line 220 illustrated in FIG. 24. The two similarly shaped segments are recovered for packaging while the external scraps are further processed to produce lesser valued products.

In the event the initial chicken breast is determined to be too small to derive two segments, the computer may operate the cutters to recover a single segment from the chicken breast.

It is to be noted that the downstream cutter is operated as a profiling cutter rather than a cross-cut cutter as previously described. For this purpose, the downstream cutter pair may be of a type that is convertible to either form, or they may be replaced with the desired type.

Some food products tend to fall into the gaps 186 between adjacent conveyors 180, 182 and 184 rather than be carried across the gaps to the next succeeding conveyor section. To accommodate the apparatus to such products the alternative form of conveyor illustrated in FIG. 27 may be employed to advantage. This conveyor is provided in the form of an endless strip of wire mesh 222. Its upstream end is supported by small diameter nose bar 224 which is spaced closely adjacent nose bar 16 of the infeed conveyor 12, forming the gap 186 for association with the upstream water jet cutters 188 and 188'. The terminal, downstream end of the wire mesh conveyor is supported by nose bar 226, with the working stretch of the conveyor supported by a plurality of longitudinally extending, laterally spaced backing plates 228. The return stretch of the wire mesh conveyor extends angularly downward from nose bar 224, under the idler roll 230, around drive sprocket 232 and tightener roll 234 to the terminal idler roll 226.

Figure 27:
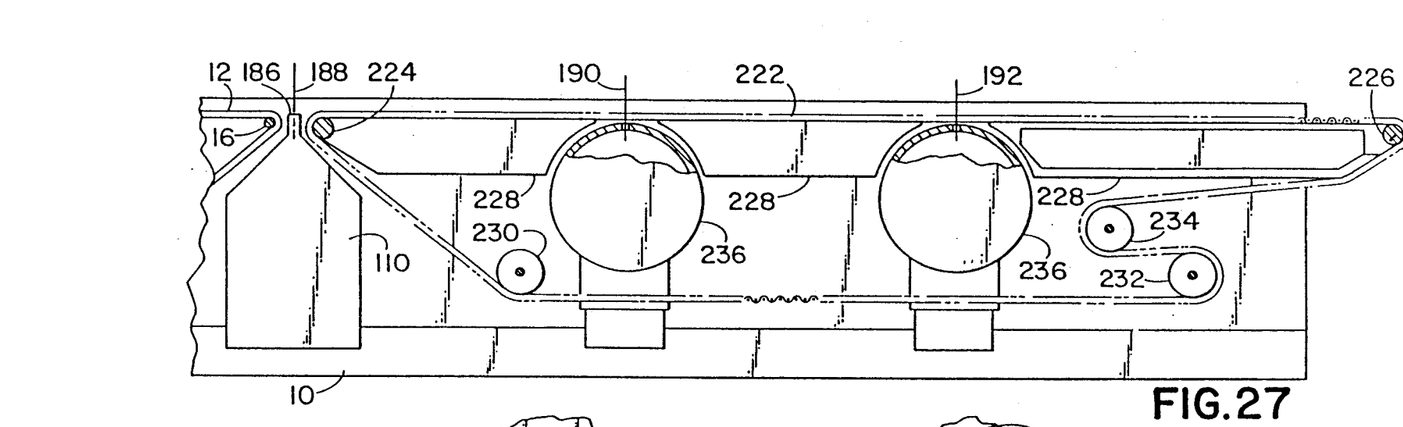
FIG. 27 is a fragmentary side elevation of an alternative form of conveyor section associated with the water jet cutters of FIG. 15.

Aligned with the middle water jet cutters 190 and 190' and the downstream cutters 192 and 192' are water recovery reservoirs 236 which function in the manner of reservoirs 110 described hereinbefore. These reservoirs receive the waste jet water through the wire mesh screen.

It will be understood that the wire mesh conveyor is usable for cutting products that can be cut with water jet pressure that is low enough to prevent cutting or other damage to the wire mesh itself. Typical of such usage is the profiling of chicken breast as discussed hereinbefore with reference to FIGS. 21-24.

Figure 25:
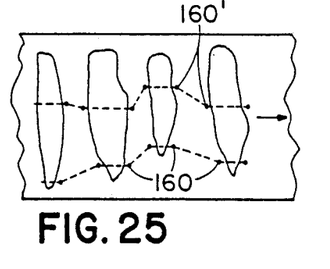
FIG. 25 is a plan view illustrating schematically the operation of either the apparatus of FIGS. 1-7 or of FIGS. 14-16 to cut fish fillets to predetermined widths and/or portion weights by arranging the infeed fillets crosswise on the conveyor and adjusting a pair of cutters laterally to different fixed positions for cutting each succeeding fillet as the fillets move on the conveyor.

FIG. 25 of the drawings illustrates still another mode of operation of either of the embodiments described hereinbefore. In the illustration, a plurality of fish fillets are shown to be deposited upon a conveyor belt, such as 34, in the transverse direction. One pair of profiling cutters, for example 160 and 160' are adjusted to selected laterally spaced positions and there maintained stationary while the leading fillet is passed forwardly through the cutters to produce two fillet segments and a tip segment to be discarded. The two fillet segments thus produced may be of the same or different weight or width. The two cutters then are shifted laterally as required for cutting the next succeeding fillet. This procedure is repeated as required for each succeeding fillet in the process line. Additional cutters may be employed to produce more than two fillet segments from each fillet.

The mode of operation illustrated in FIG. 25 performs the cutting operation at the rate of speed of travel of the conveyor. Since this is substantially slower than the rate of speed of the transverse cross-cut cutters, the mode accommodates the processing of frozen food products which require the slower speed of cutting.

Figure 26:
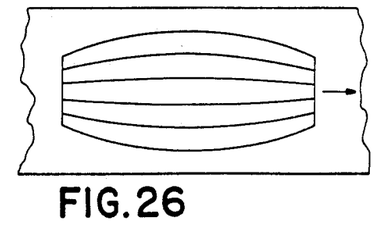
FIG. 26 is a plan view illustrating schematically the operation of either the apparatus of FIGS. 1-7 or of FIGS. 1-16 to cut a product of oval profile into a plurality of curved portions of similar shape.

FIG. 26 illustrates still another mode of operation of either of the embodiments previously described. The food product illustrated is oval in profile with the leading and trailing ends truncated. By operation first of one pair of profiling cutters and then by a second pair of profiling cutters, the food product may be cut into elongated curved strips of similar shape.

Figure 28:
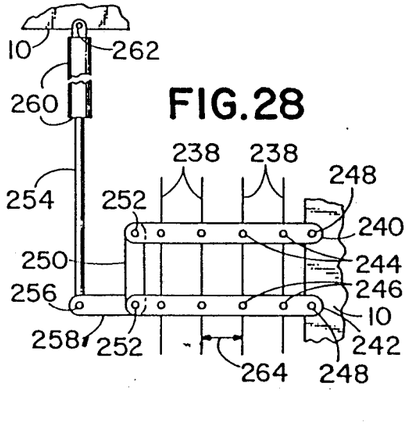
FIGS. 28 and 29 are fragmentary end elevations showing schematically an adjustable support for a plurality of laterally spaced adjustable line type cutters for use in producing multiple products such as illustrated in FIG. 26.
Figure 29:
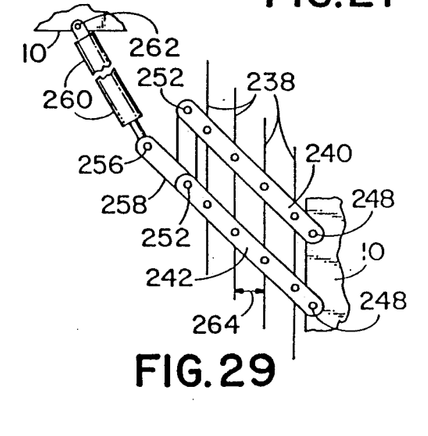

FIGS. 28 and 29 illustrate schematically an arrangement by which a plurality of laterally spaced high pressure water jet or other line-type cutters may be supported for simultaneous adjustment of the spacing between them, to produce a plurality of cuts simultaneously, such, for example, for cutting all of the curved strips of FIG. 26 simultaneously. Thus, a plurality of line-type cutters 238 are mounted in laterally spaced apart relationship on a pair of vertically spaced bars 240 and 242 as by pivot shafts 244 and 246. One end of each bar is secured pivotally to framework 10, as by pivots 248, and the opposite ends of the bars are interconnected by a link 250 through pivots 252 which are spaced apart the same distance as pivots 248.

The arrangement of bars, pivots and link thus form a pantograph system by which angular adjustment of the bars effects changing the spacing between the line type cutters 238. Adjustment of the bar is afforded by connection of the piston rod 254 of a fluid pressure piston-cylinder unit pivotally, as by pivot 256, to an extension 258 of one of the bars. The cylinder 260 of the unit is secured pivotally, as by pivot 262, to the framework 10.

As illustrated, when the piston-cylinder unit is actuated to pivot the bars 240 and 242 clockwise from the position of FIG. 28 to the position of FIG. 29, the spacing 264 between adjacent line type cutters is reduced. Computer control of the piston-cylinder unit may operate to vary the spacing between cutters continuously, for example to effect cutting the elongated curved strips of FIG. 26.

It is to be noted in the foregoing description of the operations of the apparatus embodiments of FIGS. 1-7 and 14-16, that the cutting operations performed downstream from the infeed conveyor utilized only one cutter of each pair located on the same side of the conveyor belt. Accordingly, it will be apparent that the provision of laterally spaced pairs of cutters accommodates the simultaneous processing of two separate laterally spaced production lanes on the same conveyor belt assembly, by arranging food products in two laterally spaced rows. It will also be apparent that additional processing lanes can be accommodated by providing three or more laterally spaced cutters and utilizing a wider conveyor belt.

Accordingly, the method and apparatus of this invention is capable of much greater production capacity over the aforementioned U.S. Pat. No. 4,557,019 by virtue of much greater transverse cutting speeds in both direction of traverse while simultaneously increasing the speed of travel of the conveyor belt nearly five fold, and also at least doubling the capacity of the conveyor system by accommodating at least two production lanes.

It will be apparent from the foregoing that many modifications and changes in the structural details described hereinbefore may be made to accommodate many variations in modes of operation. For example, additional cross cutting assemblies and additional profiling cutting assemblies may be incorporated, as desired. A wide variety of computer programs may be utilized to control the sequence of operation of the components described herein, to accommodate the cutting of a wide variety of food products either to portions of the same weight and volume, to the same shapes with the same or different weights, and to a wide variety of profiles. The apparatus may also be operated to cut a wide variety of materials to diverse shapes. Exemplary of these is the cutting of leather or other sheet material to the profile shapes of gloves and other pattern articles. These and other modifications and changes may be made, as desired, without departing from the spirit of this invention and the scope of the appended claims.

We claim:
1. The method of cutting food and like products to desired reduced sizes, comprising:
   (a) moving the product on a conveyor from an infeed end to an outfeed end,
   (b) determining the length, width and thickness dimensions of the moving product,
   (c) providing at least one line-type cutter having the capability of cutting the moving product along linear and nonlinear lines,
   (d) selecting one of said linear and nonlinear cutting capabilities for cutting the moving product, and
   (e) subjecting the moving product to the selected cutting action of said at least one line-type cutter to cut the moving product along lines predetermined to reduce the product to desires weight or shape.
2. The method of claim 1 for cutting a food product which includes an undesirable area, the determining of dimensions includes determining the dimensions of the undesirable area, and the cutting action includes cutting the food product along the dimensions of the undesirable area.

3. The method of claim 1 for cutting a food product wherein determining the dimensions of the moving food product comprises moving the food product through a transverse shadow line while scanning the shadow line with the camera of a camera-computer assembly capable of converting the configuration of the shadow line to electric signals representing dimensions of the moving food products, and utilizing said electric signals to actuate the cutters.

4. The method of claim 1 wherein the cutting action of the line-type cutters includes cutting in one or more of the directions substantially perpendicular to the direction of movement of the conveyor, substantially parallel to the direction of movement of the conveyor, obliquely with respect to the direction of movement of the conveyor, and along a line that is curved with respect to the direction of movement of the conveyor.

5. The method of claim 1 wherein the cutting action along predetermined lines is achieved by moving a line-type cutter substantially perpendicular to the direction of movement of the conveyor at a rate of speed relative to the rate of speed of the conveyor to effect cutting the product along a line substantially perpendicular to the direction of movement of the conveyor.

6. The method of claim 1 wherein the cutting action along predetermined lines is achieved by moving a line-type cutter substantially perpendicular to the direction of movement of the conveyor at a rate of speed relative to the rate of speed of the conveyor to effect cutting the product along a line extending obliquely with respect to the direction of movement of the conveyor.

7. The method of claim 1 wherein the cutting action along predetermined lines is achieved by moving a line type cutter substantially perpendicular to the direction of movement of the conveyor at a rate of speed relative to the rate of speed of the conveyor to effect cutting the products along a line that is curved with respect to the direction of movement of the conveyor.

8. The method of claim 1 wherein the cutting action along predetermined lines is achieved by moving a line-type cutter substantially perpendicular to the direction of movement of the conveyor to a fixed position intermediate the sides of the conveyor to effect cutting the moving product on a line parallel to the direction of movement of the conveyor.

9. The method of claim 1 for cutting a food product wherein the cutting action includes cutting the food product into two longitudinal sections and thereafter cutting one or both longitudinal sections along one or more longitudinally spaced transverse lines.

10. The method of claim 9 including the step, following cutting the food product into two longitudinal sections, of separating the two longitudinal sections laterally before cutting along a transverse line.

11. The method of cutting food and like products to desired reduced sizes, comprising:
    (a) moving the product on a conveyor from an infeed end to an outfeed end,
    (b) determining the length, width and thickness dimensions of the moving product, and
    (c) subjecting the moving product to the cutting action of at least one line-type cutter to cut the moving product along linear and non-linear lines predetermined to reduce the product to desired weight or shape.

* * * * *

UNITED STATES PATENT AND TRADEMARK OFFICE
CERTIFICATE OF CORRECTION

PATENT NO. : 4,962,568

DATED : October 16, 1990

INVENTOR(S) : Rudy et al

It is certified that error appears in the above-identified patent and that said Letters Patent is hereby corrected as shown below:

Col. 1, line 20, change "adJacent" to --adjacent--.

Col. 3, line 17, change "1-16" to --14-16--.

Col. 6, line 3, change "10" to --110--;

line 18, change "Anothe" to --Another--.

Col. 8, line 63, change "a" to --an--.

Col. 10, line 13, change "1-16" to --14-16--.

Signed and Sealed this

Twelfth Day of November, 1991

*Attest:*

HARRY F. MANBECK, JR.

*Attesting Officer*  *Commissioner of Patents and Trademarks*